United States Patent
Miericke et al.

[11] 3,903,809
[45] Sept. 9, 1975

[54] ELECTROMAGNETIC SUSPENSION GUIDANCE SYSTEM FOR A MOVING VEHICLE

[75] Inventors: Jürgen Miericke, Nurnberg; Hans Hieronymus, Erlangen; Franz Pawlitschek, Neunhof, all of Germany

[73] Assignee: Siemens Aktiengesellschaft, Munich, Germany

[22] Filed: Dec. 4, 1972

[21] Appl. No.: 311,567

[30] Foreign Application Priority Data
Dec. 7, 1971 Germany............ 2160666

[52] U.S. Cl. .................. 104/148 SS; 104/148 MS
[51] Int. Cl.² .......................................... B61B 13/08
[58] Field of Search ............... 104/148 MS, 148 SS; 308/10

[56] References Cited
UNITED STATES PATENTS

| | | | |
|---|---|---|---|
| 2,946,930 | 7/1960 | Gilbert | 308/10 |
| 3,589,300 | 6/1971 | Wipf | 104/148 SS |
| 3,717,103 | 2/1973 | Guderjahn | 104/148 SS |
| 3,780,667 | 12/1973 | Miericke et al. | 104/148 SS |

OTHER PUBLICATIONS
Powell et al., Magnetically Suspended Trains, Cryogenics and Industrial Gases, October, 1969, pages 19–24.

*Primary Examiner*—Lloyd L. King
*Assistant Examiner*—Reinhard J. Eisenzopf
*Attorney, Agent, or Firm*—Kenyon & Kenyon Reilly Carr & Chapin

[57] ABSTRACT

The invention concerns an electromagnetic system for the suspension guidance of a moving vehicle with superconducting magnets. According to the invention, a combination of an electrodynamic and an electromagnetic suspension guidance system is provided. The system has the advantage that contactless electromagnetic suspension of fast vehicles is possible, for which the support and track guidance forces can be generated in a self-stabilizing manner, with a large air gap and low losses.

14 Claims, 8 Drawing Figures

3,903,809

PATENTED SEP 9 1975

ELECTROMAGNETIC SUSPENSION GUIDANCE SYSTEM FOR A MOVING VEHICLE

FIELD OF THE INVENTION

This invention relates to an electromagnetic system for the suspension guidance of a moving vehicle with superconducting electromagnetic loops which generate reaction forces in at least in one loop of non-magnetic material. The superconducting magnet loops may, for instance, be attached to the vehicle and cause eddy currents in a loop of non-magnetic material, the magnetic repulsion force of which serves as the lifting force for the vehicle from a track. Further, loops of non-magnetic material can also be arranged in the field of the electromagnetic loops such that the field of the electromagnetic loops also produces reaction forces which serve for the horizontal stabilization of the vehicle above the track. These loops of non-magnetic material, preferably of aluminum or an aluminum alloy, are also called lift loops or stabilization loops, respectively.

BACKGROUND OF THE INVENTION

Electrodynamic guided suspension systems for a moving vehicle have been previously known. For example, in U.S. Pat. No. 1,020,943, it has been proposed to have a guided vehicle serve as a carrier for electromagnets capable of carrying large currents to generate lifting forces in interaction with electrically conducting parts of a roadbed so as to counteract the force of gravity on the vehicle and thus maintaining the vehicle suspended above the roadbed during motion.

Other electrodynamic guided systems have also been known, such as in U.S. Pat. No. 3,470,828. In one embodiment of this patent as shown in FIGS. 5 to 7, several electromagnetic systems are disposed in tandem relationship on each side of a vehicle in the direction of travel. Each system includes a superconducting vehicle loop attached to the vehicle and two oppositely-wound, normal-conducting inductive loops attached to the roadbed underneath the vehicle loop. In addition, two normal-conducting track loops are disposed above the superconducting vehicle loop. The track loops are arranged in parallel relation to each other in the direction of travel and parallel to the vehicle loop so that reaction forces are generated by the field of the vehicle loops which forces serve to generate a horizontal guidance force for the vehicle. As soon as the vehicle and, therefore, the vehicle loop is deflected horizontally from a center position, e.g. downwardly, a larger flux flows through the lower two track loops than through the upper two track loops. Accordingly, a larger current is induced in these loops to produce a restoring force in the direction toward the null or center position. In this equilibrium position, practically no currents are generated in the track loops. This embodiment of the electrodynamic suspension guidance system has also been called the zero-flux system.

In another embodiment (FIGS. 15 to 17), a vertically disposed stabilization loop is arranged above or below the superconducting vehicle loop for the generation of the horizontal guiding force. In still other embodiments, the lifting loops serving to generate the lifting force for the vehicle are arranged vertically next to the vehicle loop (FIG. 11) as well as also horizontally above and below the vehicle loop (FIG. 13). The horizontally arranged lifting loop can further be subdivided into two sub-loops, between which a vertically disposed loop for horizontal stabilization is located (FIG. 19).

In the journal "Cryogenics", June 1971, pp. 192 to 204, an electrodynamic suspension guidance system is described in which three zero-flux systems are used with one on each side of a vehicle and one in the center under the vehicle. The currents in the two vehicle loops have opposite direction, but their magnetic forces have the same direction, so that these forces add. The systems at the sides of the vehicle serve to generate the lifting force and the system underneath the vehicle generates the forces required for lateral stabilization.

From the journal "Cryogenics and Industrial Gases", October 1969, pp. 19 to 24, a further embodiment of a zero-flux system is known, which likewise contains three magnet systems for dynamic suspension guidance in a plane transverse to the direction of travel. However, these systems each contain two superconducting vehicle loops, between which a track loop is arranged in parallel relation to the vehicle loops. In the stabilization system underneath the vehicle, the vertically arranged track loop serves to generate the lateral guidance force. In the two lift systems on both sides of the vehicle, the horizontally disposed track loops serve to generate the lifting force.

Aside from the electrodynamic suspension guidance of a vehicle, electromagnetic suspension guidance of a moving vehicle is also known, for example, as is described in German Pat. No. 643,316. In accordance with this principle, an electromagnetic system maintains ferromagnetic bodies suspended by means of static electric or magnetic fields. However, special provisions are necessary, so that the suspended body, for instance, the vehicle, is held in a stable position. The magnetic field must be decreased if the body approaches the magnet, and conversely must be increased if the body moves away from the magnet. A disadvantage of this electromagnetic suspension guidance system, however, resides in the fact that control or even regulation of the current in the magnet is necessary. A further disadvantage of the electromagnetic suspension guidance systems with controlled, normal-conducting electromagnets is that only relatively small suspension heights can be achieved. As a result, the possibility of trouble in such systems is relatively great. Although lifting heights of up to a few centimeters can be obtained by the use of economically designed magnets and their power supply, the magnetic fields can not be increased at will, as otherwise the ferromagnetic bodies e.g. iron bodies, permeated by the field, will be magnetically saturated and thus will no longer be controlable. Moreover, the attraction force serving as the lifting and stabilization force is limited in such systems to about twice the vehicle weight. This can have a detrimental effect in curves of the track at high velocity and correspondingly high centrifugal forces. With this principle, a stable position of the suspended body is obtained by controlling the magnet, as described by Braunbek in "Freischwebende Koerper im elektrischen und magnetischen Feld" (Suspended bodies in the electric and magnetic field) in "Zeitschrift fuer Physik", vol. 112, pp. 753 to 763 (1939). However, electromagnetic suspension guidance has advantages, in particular, low eddy current losses in the iron body on which the attraction force acts.

Accordingly, it is an object of the invention to stabilize the position of a moving vehicle which is suspended over a track by means of an electromagnetic system.

It is another object of the invention to obtain the advantage of an electrodynamic suspension guidance system and an electromagnetic suspension guidance system in one suspension guidance system.

SUMMARY OF THE INVENTION

Briefly, the invention consists of a combination of an electrodynamic and an electromagnetic suspension guidance system for a vehicle in which use is made of the electrodynamic suspension principle by which magnetic repulsion forces are induced by eddy currents in reaction bars of electrically highly conductive material, as well as the electromagnetic suspension principle, in which an attraction force between a magnet and a ferromagnetic reaction bar is utilized. The electromagnetic suspension guidance generates large attraction forces with low eddy current losses in the ferromagnetic reaction body. In the system of the invention, the production of the lifting force particularly causes only small losses. The electrodynamic suspension principle is used preferably for the stabilization of the electromagnetic system.

Superconducting coils, which are advantageously fastened to the vehicle and which can form a zero-flux system with the electrodynamic stabilization system, can be used for the magnets. The electric losses in the normal operating position are then limited to the eddy current losses in the ferromagnetic body, which generally consists of iron. In the event of a relatively large deflection from the normal operating position, the large directive forces of the electrodynamic system become effective.

In one embodiment, an electromagnetic system for the suspension guidance of a moving vehicle comprises an electrodynamic suspension guidance means having at least one loop of non-magnetic material and at least two superconducting electromagnetic loops for generating reaction forces in the loop of non-magnetic material and an electromagnetic suspension guidance means for generating a lifting force on the vehicle in a direction away from the loop of non-magnetic material. The electrodynamic means more specifically includes one horizontally disposed loop of non-magnetic material for generating a second vertical lifting force on the vehicle and one vertically disposed loop of non-magnetic material for generating a horizontal stabilizing force on the vehicle. These latter loops can be disposed in a cross relative to each other. The electromagnetic means includes at least one ferromagnetic body disposed in spaced relation to the vertically disposed loop within the field of the superconducting electromagnetic loops to generate the first lifting force.

In addition, a non-magnetic body is disposed above the ferromagnetic body for permeation by the field of the super-conducting electromagnetic loops in response to magnetic saturation of the ferromagnetic body. These respective bodies can form a common body.

The various loops of the electrodynamic means can be formed as curved or bent members about a non-magnetic loop or as pairs of flat members on opposite sides of a non-magnetic loop. Also, a plurality of both types of such loops can be arranged in tandem to form a rail.

DESCRIPTION OF THE DRAWINGS

Referring to FIG. 1, where a current-carrying coil which serves as a magnet M is spaced a distance $h$ from a ferromagnetic body K, in accordance with the electromagnetic suspension principle, the curve of the lifting force F which is characteristic of an electromagnet M is determined if one takes into consideration only the field in the air gap between the ferromagnetic body K and the magnet M. This field is illustrated by broken lines and is not designated further. It is also assumed for the purpose of simplification that the magnetic field is homogeneous and that the ferromagnetic body K has perfect permeability. The generated lifting force F is then obtained from Maxwell's formula for the attraction force:

$$F = \frac{A \cdot B^2/2}{u_o}$$

where A is the pole area, B the induction and $u_o$ the induction constant. As the induction B is a function of the distance $h$ of the magnet M from the ferromagnetic body K, one obtains theoretically an infinite force of attraction of the magnet M by the body K as long the magnetic saturation of the body K is neglected. In electromagnetic suspension guidance, the attraction force F is utilized as the lifting force for a vehicle.

Figure 2:
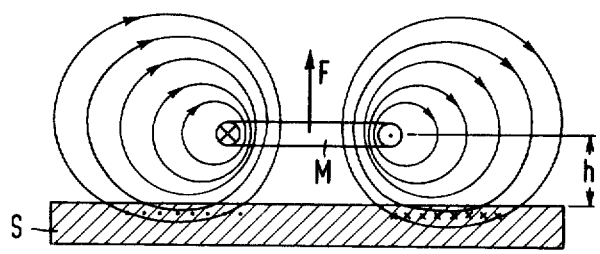
FIG. 2 schematically illustrates the electrodynamic suspension principle.

Referring to FIG. 2, where a suspended magnet M moves with a predetermined velocity at a distance, $h$ over an extended surface of a bar S which is elongated in the direction of motion and is of non-ferromagnetic material, for instance, aluminum or copper, in accordance with the electrodynamic suspension principle an electrodynamic repulsion force F is obtained. According to Lenz' law, currents induced by the magnetic flux of the magnet M flow in the bar S with such a direction that they oppose any change of the magnetic flux. The repulsion force F generated between the inducted current I and the field with the induction B is obtained as:

$$F = I \times B$$

In addition, the eddy currents induced in the bar S produce a braking force with respect to the moving vehicle according to the principle of the well-known eddy current brake. These eddy current losses may, for instance, for a 40-ton vehicle be up to about 2500 kW.

These electric losses must be compensated by the propulsion system.

Figure 3:
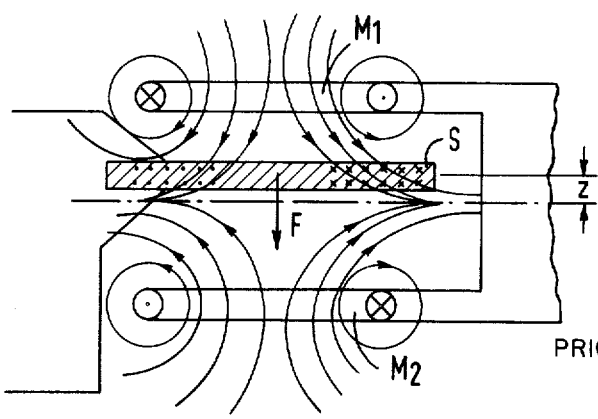
FIG. 3 schematically illustrates a zero-flux system of an electrodynamic suspension guidance system.

Referring to FIG. 3, a known zero-flux system of an electrodynamic suspension guidance system is obtained through the interaction of two magnet coils $M_1$ and $M_2$. The two magnet coils $M_1$, $M_2$ are disposed in parallel relation to each other and carry currents which produce magnetic fields directed against each other, as indicated by arrows. Somewhat outside the center plane, the so-called zero-flux zone, a coil S of non-magnetic material is arranged, which preferably takes the form of a plate, or in particular, of a bar (rail). If this bar S, which is made preferably of aluminum or an alminum alloy, moves in the zero-flux zone, the currents induced therein and, therefore, the directing and braking forces are zero. Upon an excursion or movement of the bar S a distance Z from the center plane as indicated by the dash-dotted line, eddy currents are generated in the aluminum bar S according to the electrodynamic principle. These eddy currents produce a force acting in the direction toward the zero-flux zone, i.e. a restoring force. The strength of the zero-flux arrangement increases if the current in the magnets $M_1$ and $M_2$, which may preferably be superconducting magnets, is increased and if the mutual spacing of the magnets $M_1$ and $M_2$ becomes smaller. In the zero-flux zone, the losses in the bar S remain zero as long as the finite thickness of the bar S is neglected.

Figure 4:
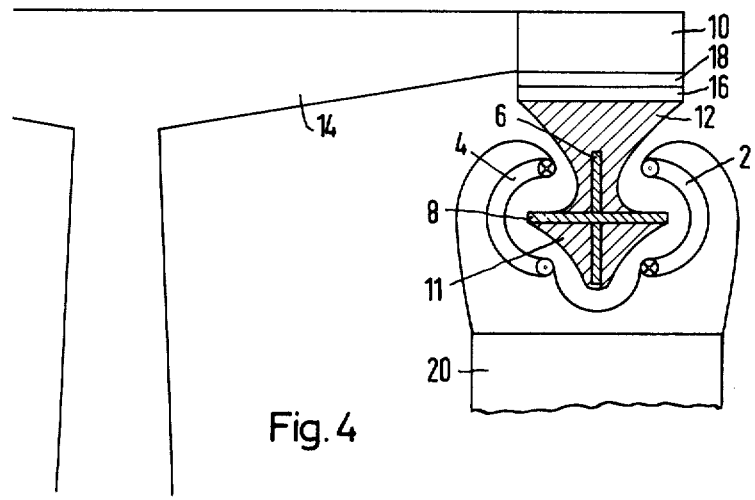
FIG. 4 illustrates a partial cross-sectional view of an electromagnetic suspension guidance system according to the invention.

Referring to FIG. 4, two elongated superconducting vehicle loops 2 and 4 which have bends at the ends, are disposed in parallel relation to each other and are attached to a vehicle body 20 (not shown). The loops 2, 4 enclose a cross or cruciform arrangement of a vertical stabilization loop 6 and a horizontally arranged lift loop 8. These two loops 6, 8 can preferably form a closed plate, particularly a rail, which can advantageously be laminated. The use of individual layers parallel to the plane of the plate limits the component of the eddy currents which is perpendicular to the plane of the plate. The cross formed by the loops 6 and 8 is fastened to a support member 14 by means of a suspension 10 which establishes a connection with a roadbed (not shown). The bar cross formed by the lift loop 8 and the stabilization loop 6 can be stiffened by a suitable stiffening means 11 of non-magnetic material which also forms a connecting member 12 between the bar cross and the support arrangement 14 above the bar cross.

Figure 1:
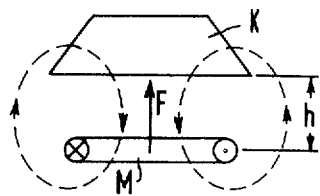
FIG. 1 schematically illustrates the electromagnetic suspension principle.

A ferromagnetic body 16, e.g. of steel, is disposed above the connecting member 12 at a location so as to be permeated by the fields of the two vehicle loops 2, 4. These fields generate an attraction force in the body 16 as explained with the aid of FIG. 1, which serves as the lifting force for the vehicle 20. In the operating position of the vehicle 20, the lift rail 8 is situated in the zero-flux zone. As a result, no eddy currents and therefore, no losses are produced in this rail 8. Eddy currents are, however, produced should the rail 8 deflect from the zero-flux zone. Corresponding restoring forces then become effective. The lift rail 8 thus serves essentially only for vertical stabilization of the magnet system.

A particularly advantageous further embodiment of the arrangement according to FIG. 4 is obtained by designing the ferromagnetic body 16 for magnetic saturation at a predetermined magnitude of the magnetic flux. If this flux is exceeded, the material of the body 16 goes into saturation and therefore has nearly no effect on the magnetic field. The field then permeates a body 18 of non-magnetic material, preferably aluminum or an aluminum alloy, which is arranged above the ferromagnetic body 16 and generates eddy currents which produce corresponding restoring forces. The non-magnetic body 18 therefore obtains an additional stabilization for the suspended vehicle in the vertical direction, which particularly counteracts oscillatory movements.

For large currents, supercondcting coils can preferably be provided as the vehicle loops 2 and 4, which are held at cryogenic temperature in a manner known per se by suitable coolants, particularly helium. The cooling system is not shown in the drawings.

Figure 5:
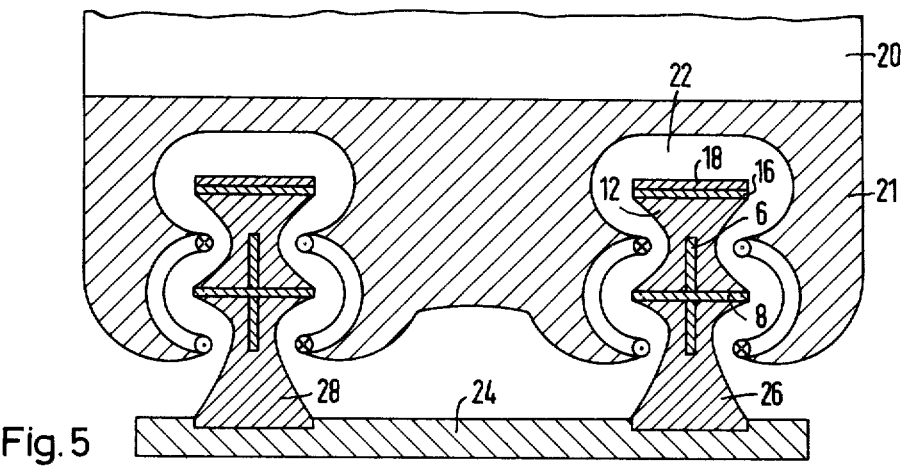
FIG. 5 illustrates a cross-sectional view of a ground-based electromagnetic suspension guidance system according to the invention.

Referring to FIG. 5, wherein like reference characters indicate like parts as above, a ground-based version of a suspension guidance system has two systems each of which includes a cross arrangement of a lift loop 8 and a stabilization loop 6 mounted on a roadbed 24 by means of respective supports 26, 28 of non-magnetic material. A ferromagnetic body 16 and a rail 18 are disposed in each system above the stabilization loops 6 with the rail 18 above the body 16; the ferromagnetic body 16 and 18 are arranged in a recess 22 of the chassis 21 of the vehicle 20. The chassis 21 is frther provided with a transport frame with wheels (not shown) which rest in the rest position in the known manner on tracks (not shown) of the roadbed 24. The operation of this suspension guidance system is similar to the operation of the system of FIG. 4.

Figure 6:
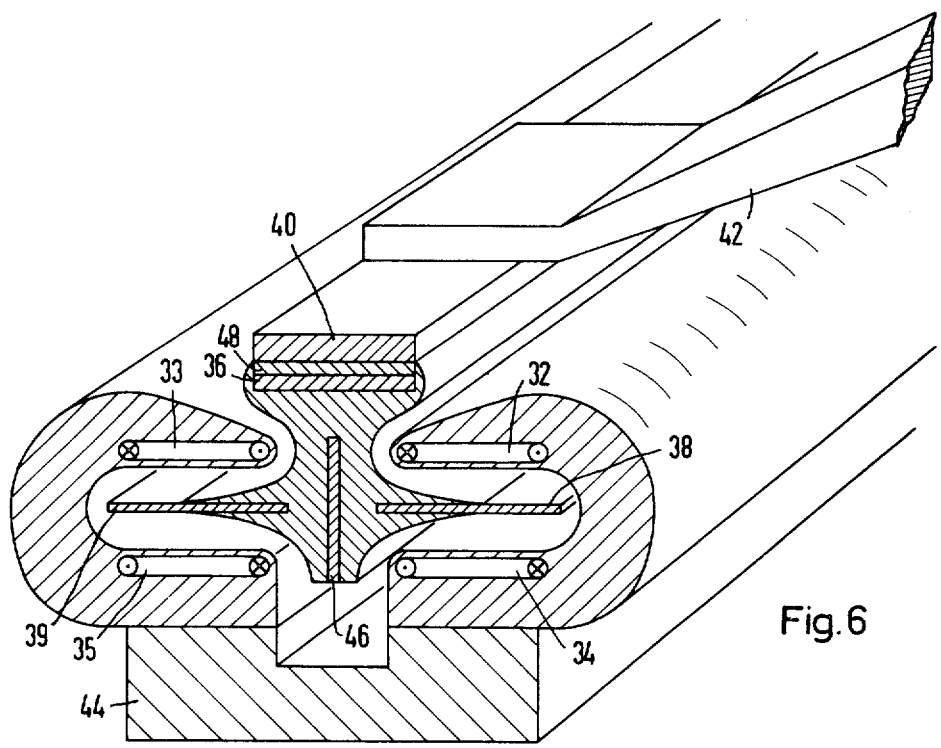
FIG. 6 illustrates a perspective fragmentary view of an electromagnetic suspension guidance system having several zero-flux systems according to the invention.

Referring to FIG. 6, the electromagnetic suspension guidance system can alternatively be formed of two pairs of horizontally disposed vehicle loops, 32–34, 33–35 which are mounted on opposite sides of a likewise horizontal loop of non-magnetic material such as a lift rail 38, 39 to form two electrodynamic zero-flux systems. A stabilization loop 46 is vertically arranged between these two lift systems to generate horizontal stabilizing forces in such a manner that the loop 46 is situated in a third zero-flux system constituted by the conductors of the magnet coils 32 to 35 facing the rail 46. In addition, a ferromagnetic body 36 is mounted above these three zero-flux systems so as to be permeated by the field of the two vehicle loops 32 and 33. These loops 32, 33 thus generate a magnetic force in the body 36 which constitutes an additional lifting force and therefore relieves the two lift loops 38 and 39 of a load. This ferromagnetic body 36 can advantageously also be designed for magnetic saturation at a predetermined maximum magnetic flux. If this flux is exceeded, a bar 48 of non-magnetic material, preferably aluminum, which is arranged above the ferromagnetic body 36, becomes effective in a manner similar to that described above. A carrier 40, which is connected with a suspension arrangement 42, serves to suspend the system from a support for the track (not shown) which is to be arranged on a connecting member 44 underneath the electromagnetic system (not shown).

The cooling equipment for the superconducting vehicle coils 32 to 35 can be constructed in a manner known per se and is therefore not shown in the figure or further described.

The distance of the ferromagnetic body 36 from the horizontal zero-flux zone and from the rails 38, 39 and the construction of the body 36, which may preferably be laminated, are chosen so that the attraction force to the body 36 corresponds at least approximately to the mean weight of the vehicle (not shown). In this way, the rails 38, 39 are situated in the zero-flux zone in normal operation. In this normal operating condition, the steel material of the body 36 is not magnetically saturated. However, at a predetermined deflection of the vehicle upward, the magnetic flux of the vehicle coils 32, 33 penetrate the ferromagnetic body 36 and induce currents in the rail 48 which, according to the electrodynamic principle, produce a repulsion force between the body 36 and the vehicle coils 32, 33. In the normal operating position, the electric losses are mainly limited to the eddy current losses in the ferromagnetic body 36, as the lift rails 38, 39 and the stabilization bar 46 each move in a zero-flux zone. If the vehicle is deflected from this normal operating position, the large directive forces of the electrodynamic zero-flux system become effective automatically.

Figure 7:
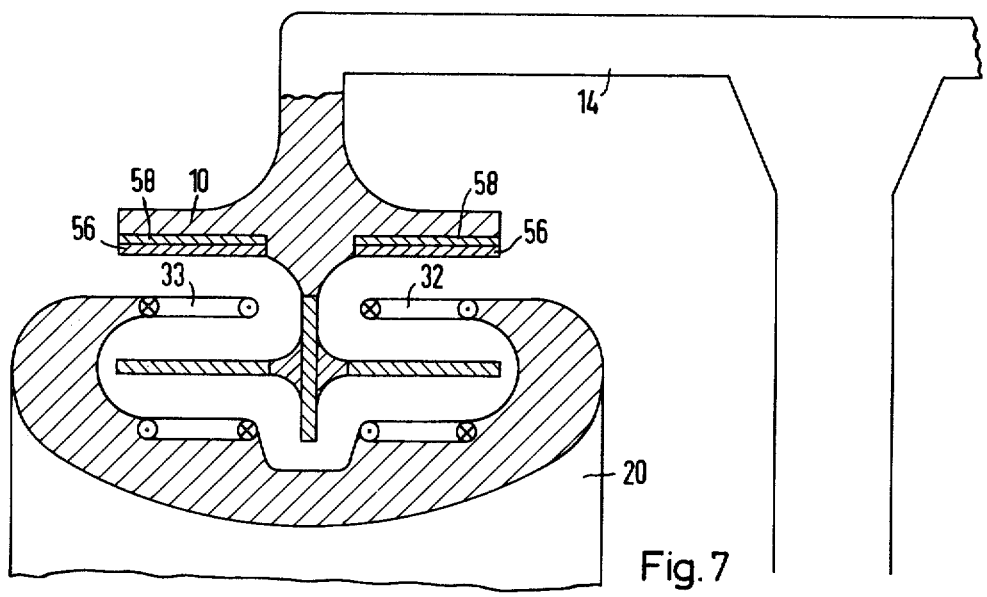
FIG. 7 illustrates a modified suspension guidance system similar to FIG. 6 for an overhead rail.

Referring to FIG. 7, wherein like reference characters indicate like parts as above, the electromagnetic suspension guidance system can be constructed for a vehicle body 20 which is mounted on a support member 14 via a suspension system according to FIG. 6 and a carrier 10. In this construction, a ferromagnetic body 56 is arranged above each of the two upper vehicle coils 32 and 33. Also, a rail 58 of non-magnetic material, preferably aluminum or an aluminum alloy, is mounted above each ferromagnetic body 56. These rails 58 are disposed so that eddy currents are generated therein as soon as the ferromagnetic bodies 56 becomes magnetically saturated. These eddy currents produce corresponding magnetic forces which act as a restoring force on the vehicle coil 32–35 as soon as the vehicle body 20 and, thus, the vehicle coils 32–35 connected thereto move out of the normal operating position in the direction toward the suspension member 10. By means of the rails 58, oscillations of the suspension system, can thereby be suppressed additionally.

Figure 8:
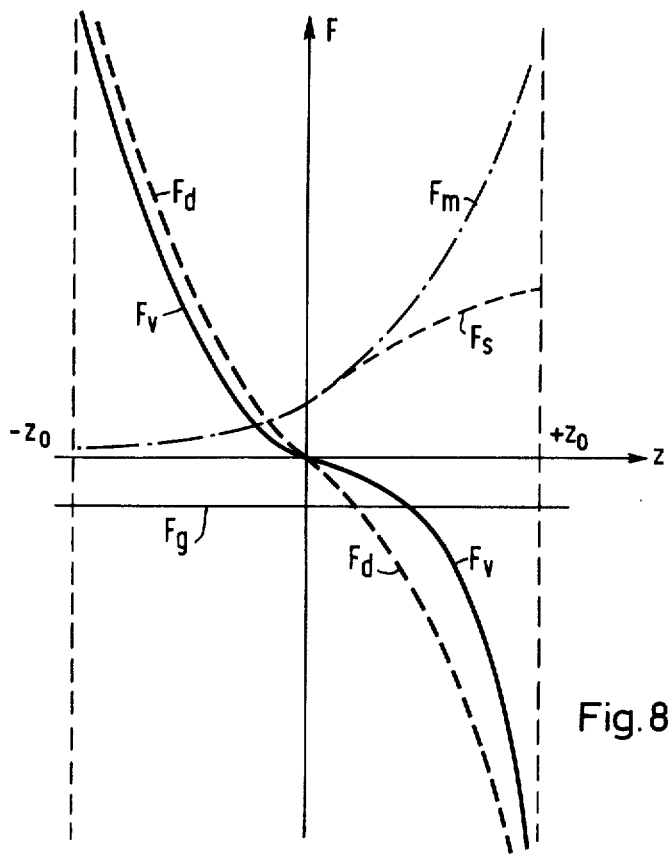
FIG. 8 graphically illustrates the effects of the magnetic forces caused by the system of the invention.

Referring to FIG. 8, the forces F produced by the suspension system are illustrated as a function of the distance $z$ of the lift loops 8 and 38, 39, respectively, from the zero-flux zone of the magnet loops 2, 4 and 32 to 35, respectively. The curve shown with the dash-dotted line of the electromagnetic force $F_m$ exhibits an exponential rise of the magnetic force as long as the vehicle coils approach the ferromagnetic body 16, 36, 56, respectively, i.e. the smaller the mutual distance of these bodies becomes. If, on the other hand, the ferromagnetic body 16, 36, 56 is designed for saturation by the magnetic field, the force $F_x$ approaches a maximum value of the field if the vehicle coils approach the ferromagnetic body, as is shown by the dashed line. The electrodynamic directive forces $F_d$ increase exponentially for a deflection to both sides, as shwon by a dashed line. The maximum permissible deflections are denoted with $+z_o$ and $-z_o$. The weight of the vehicle acts as a constant negative pulling force $F_g$ and opposes the lifting force. The resultant force $F_r$, of these forces is shwon as a curve of solid line. In the normal operating position, the force of gravity $F_g$ of the vehicle and the electromagnetic attraction force $F_x$ are equal and opposed, so that the resulting force $F_r$ is zero.

What is claimed is:

1. An electromagnetic system for the suspension guidance of a moving vehicle comprising:

a. a zero flux electrodynamic suspension guidance means comprising:

1. at least one loop of non-magnetic conductive material;
   2. at least two superconducting electromagnetic loops disposed on opposite sides of said loop of non-magnetic material inducing currents therein which generate an upward and a downward repulsion force on said superconducting loops;

b. a ferromagnetic body disposed above said superconducting loops and cooperating with at least one of said superconducting loops to generate a lifting force on the vehicle in a direction opposite to the force of gravity on said superconducting loops.

2. An electromagnetic system as set forth in claim 1 wherein in said electrodynamic suspension guidance means said one loop of non-magnetic material is disposed horizontally and further including a vertically disposed loop of non-magnetic conductive material for generating a horizontal stabilizing force on the vehicle, said vertical loop being disposed in a cross relative to said horizontal loop and wherein said ferromagnetic body is disposed in spaced relationship to said vertically disposed loop within the field of said superconducting electromagnetic loops to generate said lifting force opposite the force of gravity.

3. An electromagnetic system as set forth in claim 2 which further includes a non-magnetic body above said ferromagnetic body for permeation by said field in response to magnetic saturation of said ferromagnetic body.

4. An electromagnetic system as set forth in claim 3 wherein said non-magnetic body is laminated.

5. An electromagnetic system as set forth in claim 2 wherein said latter loops form a common body.

6. An electromagnetic system as set forth in claim 2 wherein said two superconducting electromagnetic loops are disposed in parallel relation to each other and are of an elongated length with bends at each end thereof.

7. An electromagnetic system as set forth in claim 6 which further includes a non-magnetic body above said ferromagnetic body for permeation by said field in response to magnetic saturation of said ferromagnetic body.

8. An electromagnetic system as set forth in claim 7 wherein said non-magnetic body and said ferromagnetic body form a common flat body.

9. An electromagnetic system as set forth in claim 8 wherein said horizontally disposed loop of non-magnetic material and said vertically disposed loop of non-magnetic material are flat.

10. An electromagnetic system as set forth in claim 9 wherein a plurality of said loops of non-magnetic material are arranged in tandem to form a rail.

11. An electromagnetic system as set forth in claim 9 wherein said loops of non-magnetic material are made of aluminum.

12. An electromagnetic system as set forth in claim 9 wherein said loops of non-magnetic material are made of a light metal alloy.

13. An electromagnetic system as set forth in claim 2 which further comprises a support member supporting said loops of non-magnetic material and said ferromagnetic body thereon.

14. An electromagnetic system as set forth in claim 2 wherein said ferromagnetic body is laminated.

* * * * *